United States Patent
Jerichow

(10) Patent No.: US 10,893,026 B2
(45) Date of Patent: Jan. 12, 2021

(54) PRIVACY MANAGING ENTITY SELECTION IN COMMUNICATION SYSTEM

(71) Applicant: Nokia Technologies Oy, Espoo (FI)

(72) Inventor: Anja Jerichow, Grafing (DE)

(73) Assignee: Nokia Technologies Oy, Espoo (FI)

( * ) Notice: Subject to any disclaimer, the term of this patent is extended or adjusted under 35 U.S.C. 154(b) by 286 days.

(21) Appl. No.: 15/840,554

(22) Filed: Dec. 13, 2017

(65) Prior Publication Data
US 2019/0149521 A1 May 16, 2019

(30) Foreign Application Priority Data

Nov. 16, 2017 (EP) ..................................... 17202176

(51) Int. Cl.
| | |
|---|---|
| *H04L 29/06* | (2006.01) |
| *H04L 9/08* | (2006.01) |
| *H04L 9/32* | (2006.01) |
| *H04W 12/02* | (2009.01) |
| *H04W 12/00* | (2009.01) |
| *H04W 12/04* | (2009.01) |

(52) U.S. Cl.
CPC ........ *H04L 63/0407* (2013.01); *H04L 9/0825* (2013.01); *H04L 9/3226* (2013.01); *H04W 12/02* (2013.01); *H04L 63/0421* (2013.01); *H04L 63/0442* (2013.01); *H04L 63/062* (2013.01); *H04W 12/00514* (2019.01); *H04W 12/04* (2013.01)

(58) Field of Classification Search
CPC . H04L 63/0407; H04L 9/0825; H04L 9/3226; H04W 12/02
See application file for complete search history.

(56) References Cited

U.S. PATENT DOCUMENTS

2009/0119742 A1* 5/2009 Graziani ............. H04L 63/0428 726/1
2013/0003971 A1 1/2013 Forsberg et al.
(Continued)

FOREIGN PATENT DOCUMENTS

EP 17202176.8 11/2020

OTHER PUBLICATIONS

3GPP, "3rd Generation Partnership Project; Technical Specification Group Services and System Aspects; System Architecture for the 5G System; Stage 2 (Release 15)," 3GPP TS 23.501 V1.5.0, Nov. 2017, 170 pages.

(Continued)

*Primary Examiner* — Noura Zoubair
(74) *Attorney, Agent, or Firm* — Ryan, Mason & Lewis, LLP

(57) ABSTRACT

In a home network of a communication system, wherein one or more cryptographic key pairs are provisioned for utilization by subscribers of the home network to conceal subscriber identifiers provided to one or more access points in the communication system, the method comprises provisioning one or more privacy managing entity identifiers for utilization by the subscribers when providing their concealed subscriber identifiers to the communication system. Each of the one or more privacy managing entity identifiers identify a given privacy managing entity in the communication system configured to de-conceal a given subscriber identifier.

20 Claims, 4 Drawing Sheets

(56) References Cited

U.S. PATENT DOCUMENTS

2016/0050697 A1* 2/2016 Ahmavaara ......... H04L 63/0815
                                                                455/450
2018/0013568 A1* 1/2018 Muhanna ................... H04L 9/14
2018/0082304 A1* 3/2018 Summerlin .............. G06N 3/04

OTHER PUBLICATIONS

3GPP, "3rd Generation Partnership Project; Technical Specification Group Services and System Aspects; Procedures for the 5G System; Stage 2 (Release 15)," 3GPP TS 23.502 V1.3.0, Nov. 2017, 215 pages.
3GPP, "3rd Generation Partnership Project; Technical Specification Group Services and System Aspects; Security Architecture and Procedures for 5G System (Release 15)," 3GPP TS 33.501 V0.3.0, Aug. 2017, 44 pages.
3GPP, "3rd Generation Partnership Project; Technical Specification Group Services and System Aspects; Study on the Security Aspects of the Next Generation System (Release 14)," 3GPP TR 33.899 V1.1.0, Mar. 2017, 491 pages.
Vietnamese Patent Application Serial No. 1-2018-05134, Results of Formality Examination, and English Translation dated Dec. 24, 2018, 2 pages.
Search Report for European Patent Application No. 17202176.8-1218, dated Apr. 9, 2020. 8 pages.
3GPP, "Generation Partnership Project; SIDF Functionality," 3GPP TSG SA WG3 (Security) Meeting #88Bis Adhoc, S3-172356-V4, Oct. 2017, 3 pages.

\* cited by examiner

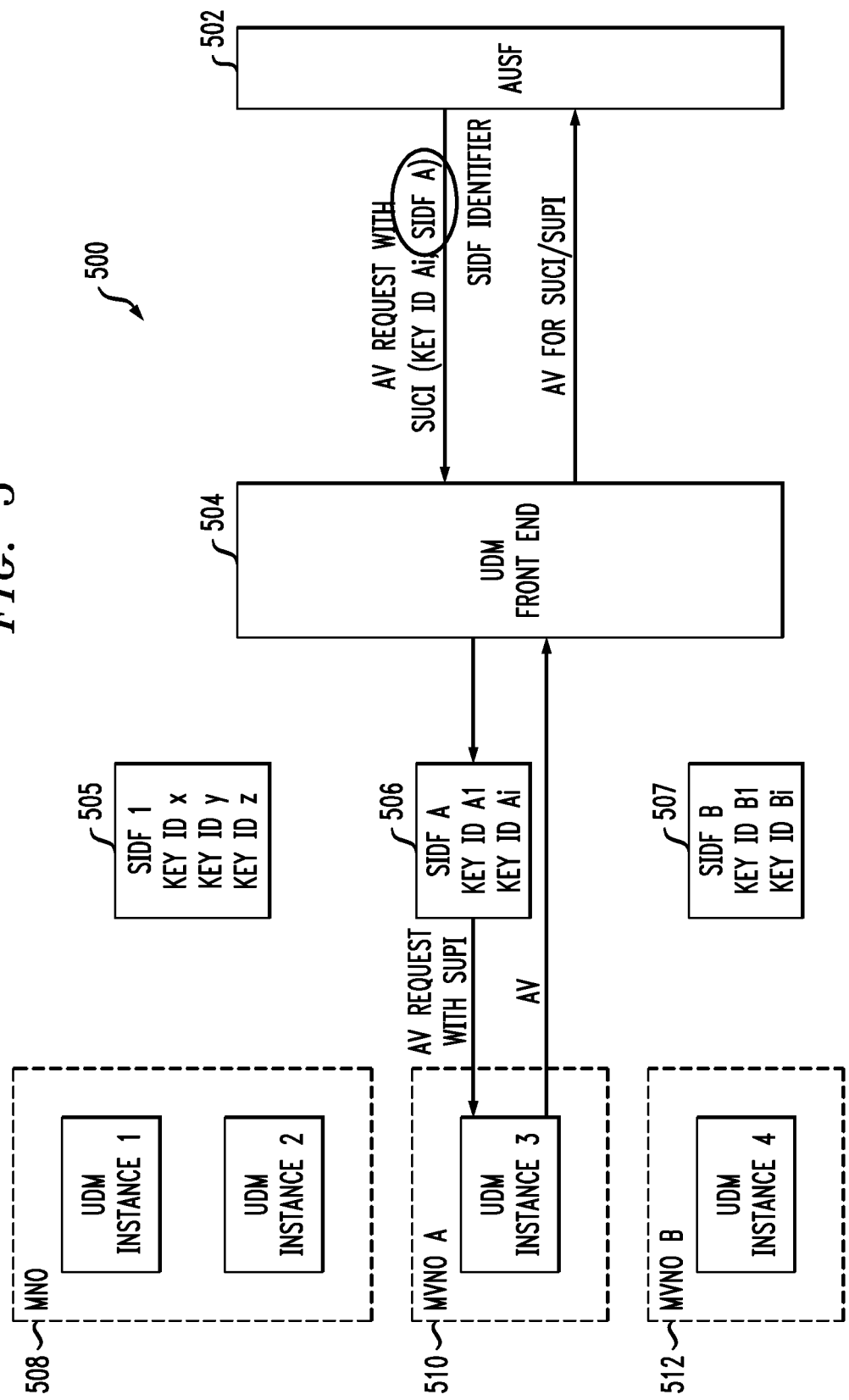

PRIVACY MANAGING ENTITY SELECTION IN COMMUNICATION SYSTEM

FIELD

The field relates generally to communication systems, and more particularly, but not exclusively, to subscriber privacy management techniques within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network. The access point (e.g., gNB) is illustratively part of an access network of the communication system. For example, in a 5G network, the access network is referred to as a 5G System and is described in 5G Technical Specification (TS) 23.501, V1.5.0, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet).

Privacy is an important consideration in any communication system. Privacy is broadly addressed in 5G Technical Report (TR) 33.899, V1.1.0, entitled "3rd Generation Partnership Project; Technical Specification Group Services and System Aspects; Study on the security aspects of the next generation system (Release 14)," the disclosure of which is incorporated by reference herein in its entirety. In particular, TR 33.899 identifies subscription (UE) privacy as one of the most important security areas to be addressed in 5G networks. 5G Technical Specification (TS) 33.501, V0.3.0, entitled "3rd Generation Partnership Project; Technical Specification Group Services and System Aspects; Security Architecture and Procedures for 5G System (Release 15)," the disclosure of which is incorporated by reference herein in its entirety, provides the normative security description.

SUMMARY

Illustrative embodiments provide techniques for providing subscriber privacy in communication systems.

For example, in one illustrative embodiment, a method comprises the following step. In a home network of a communication system, wherein one or more cryptographic key pairs are provisioned for utilization by subscribers of the home network to conceal subscriber identifiers provided to one or more access points in the communication system, the method comprises provisioning one or more privacy managing entity identifiers for utilization by the subscribers when providing their concealed subscriber identifiers to the communication system. Each of the one or more privacy managing entity identifiers identifies a given privacy managing entity in the communication system configured to de-conceal a given subscriber identifier.

In further illustrative embodiments, the method comprises selecting a privacy managing entity from a plurality of privacy managing entities in the communication system based on a given privacy managing entity identifier received from a given subscriber, and de-concealing the given subscriber identifier at the selected privacy managing entity. In one illustrative embodiment, subscriber authentication data is requested concurrent with the privacy managing entity selecting step. In another illustrative embodiment, subscriber authentication data is requested following the de-concealing step.

In a 5G communication system embodiment, at least one of the privacy managing entities is implemented in the communication system as a subscription identifier de-concealing function (SIDF). The SIDF may be implemented in the communication system as a service offered by a user data management (UDM) function. The SIDF may be co-located with the UDM function or an authentication and security function (AUSF).

In yet another illustrative embodiment, in user equipment, a method stores: (i) at least one public key associated with at least one cryptographic key pair, the cryptographic key pair being provisioned by a home network of a communication system for use by the user equipment to conceal a subscriber identifier to be provided to one or more access points in the communication network; and (ii) at least one privacy managing entity identifier for utilization by the user equipment when providing a concealed subscriber identifier to the communication system, wherein the privacy managing entity identifier identifies a given privacy managing entity in the communication system configured to de-conceal the concealed subscriber identifier.

Advantageously, illustrative embodiments enable the selection of the appropriate SIDF in the communication system, particularly when the home network operator (mobile network operator or MNO) has several UDM instances and/or also has one or more contracted mobile virtual network operators or MVNOs which may maintain their own public/private key pairs for purposes of subscriber identifier concealment.

Further embodiments are provided in the form of non-transitory computer-readable storage medium having embodied therein executable program code that when executed by a processor causes the processor to perform the above steps. Still further embodiments comprise apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 5 is a block diagram of at least part of a communication system implementing subscriber privacy management in another illustrative embodiment.

DETAILED DESCRIPTION

Figure 1:
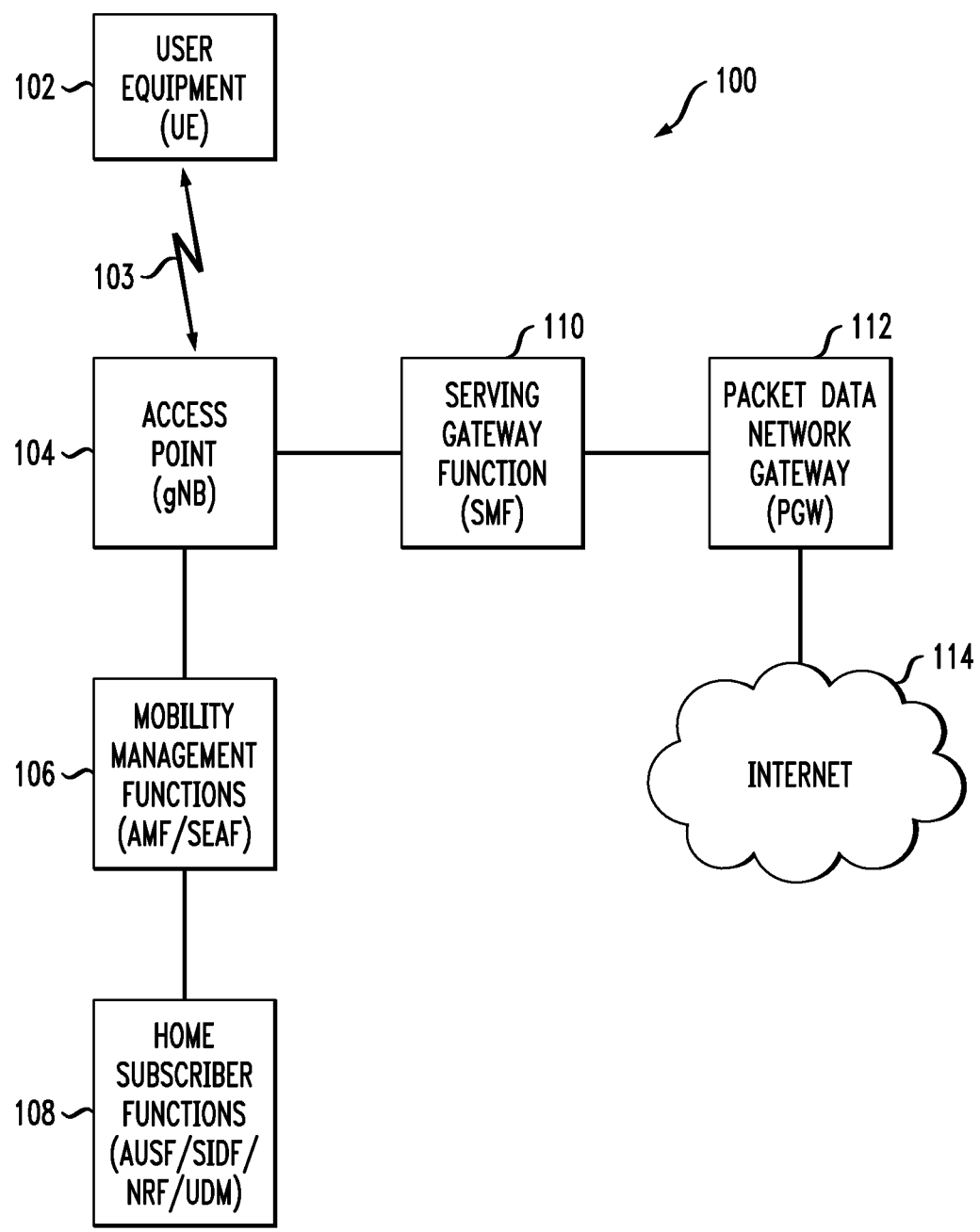
FIG. 1 is a block diagram of a communication system in an illustrative embodiment.

Embodiments will be illustrated herein in conjunction with example communication systems and associated techniques for providing subscriber privacy management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems including, but not limited to, WiMAX systems and Wi-Fi systems, as well as 3GPP systems that precede the 5G system (LTE, etc.).

In accordance with illustrative embodiments implemented in a 5G communication system environment, one or more of the following 3GPP technical specifications (TS) and technical reports (TR) may provide further explanation of network elements/functions and/or operations that may interact with parts of the inventive solutions: 3GPP TS 23.501, 3GPP TS 23.502, 3GPP TS 33.501, and 3GPP TR 33.899, the disclosures of which are incorporated by reference herein in their entireties. Other 3GPP TS/TR documents may provide other conventional details that one of ordinary skill in the art will realize. However, while well-suited for 5G-related 3GPP standards, embodiments are not necessarily intended to be limited to any particular standards.

As mentioned above, privacy of subscription identifiers when communicated over the air interface between the user equipment and the network access point has been a significant issue for communication systems. Efforts have been made in 5G networks to address this significant issue.

For example, it is known that malicious actors attempt to learn subscriber identifiers either by passively (passive catcher) eavesdropping over the air interface between the UE and the gNB or actively (active catcher) requesting the subscriber identifier.

Solutions to provide privacy over the air interface can be generally grouped in three solution classes: (1) pseudonym solutions based on symmetric cryptographic systems, which demand a home subscriber server/function of the UE's home network to map a changing pseudonym to the permanent subscription identifier of the UE; (2) encryption of the permanent subscription identifier of the UE using the public key of the home network operator; and (3) encryption of the permanent subscription identifier of the UE using the public key of the serving network operator.

While embodiments can be adapted for any of the above-mentioned solutions, illustrative embodiments provide subscriber privacy management techniques from the perspective of solution 2 (encryption of the permanent subscription identifier of the UE using the public key of the home network operator).

Note that, in one example, an International Mobile Subscriber Identity (IMSI) is a permanent subscription identifier (subscriber identity) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN).

In a 5G communication system, an IMSI is referred to as a Subscription Permanent Identifier (SUPI). The SUPI is never sent over the radio interface (except in emergency situations). In the case of an IMSI as a SUPI, the MSIN provides the subscriber identity. Thus, only the MSIN portion of the IMSI needs to be encrypted. The MNC and MCC portions of the IMSI provide routing information, used by the serving network to route to the correct home network. The encryption-protected SUPI is called a Subscription Concealed Identifier (SUCI). The home network operator (mobile network operator or MNO) generates one or more public/private key pairs for the purpose of enabling concealment of the SUPI. The public key of a given key pair is provisioned to all MNO subscribers and is used to conceal the SUPI. Only the MNO can de-conceal the SUPI, since the MNO has the corresponding private key.

SUPIs are typically maintained in the User Data Management/User Data Repository (UDM/UDR) and managed by the MNO. An MNO can have several UDM instances accessible through a UDM front end, each of them relating to a distinct set of subscribers. In addition, an MNO may have contracted resources to a Mobile Virtual Network Operator (MVNO), which also may have an allocated part of the UDM.

From the MVNO perspective, the MNO is sharing/providing its resources to the MVNO, but the MVNO has its own database. Perhaps the MNO is managing the subscriber on behalf of the MVNO, but for this it would typically use a distinct UDM instance.

Before the correct UDM instance can be addressed, the SUCI needs to be decrypted (or de-concealed). A new entity referred to as a Subscription Identifier De-Concealing Function (SIDF) was introduced in 3GPP TS 33.501 for the purpose of de-concealing the SUCI.

3GPP TS 33.501 does not address where in the network the SIDF should be located. It is realized that the SIDF and UDM can be co-located and/or the SIDF can be offered as a service provided by UDM. An SIDF could be maintained by each UDM instance. Alternatively, the SIDF can be co-located with an Authentication and Security Function (AUSF), or some other network element/function.

Regardless of where the SIDF is actually implemented, it is realized that a problem exists as to how to select the appropriate SIDF in the communication system. This problem is particularly troublesome if the MNO has several UDM instances and also contracted MVNOs that have their own public/private key pair for privacy related operations. In case of the MNO having MVNO contracts, each MNO and MVNOs may want to operate their own SIDFs, one for each of the MNO/MVNOs. Further, another use case is that there is only one global or central SIDF for the MNO, but several public key pairs are stored. Thus, the MVNOs could provision their own public/private key pair to their subscribers, but management stays with the MNO. As a third option, the MNO's public/private key pair could also be valid for the MVNOs.

Illustrative embodiments overcome the above and other problems associated with the selection of the appropriate subscriber privacy managing entity, such as an SIDF, in a communication system. More particularly, when provisioning the privacy-related public key to all subscribers of the home network operator, the home network operator or provisioning entity includes a new identifier (identification number, code, address, etc.) by which a privacy managing entity, such as the de-concealing function SIDF, can be located within the operator's domain. In illustrative embodiments, the privacy managing entity identifier can point to a central location or to a UDM instance. In an alternative embodiment, the privacy managing entity identifier can be included in the key identifier if less security is permissible. However, in preferred embodiments, this is not optimal since the key identifier is for finding the correct key for de-concealment, not necessarily for finding the location of the de-concealment function.

Thus, in illustrative embodiments, the SUCI format is enhanced to transport the privacy managing entity identifier within the UE initiated registration request. The privacy managing entity identifier can be referred to as an "SIDF identifier" or an "MNO/MVNO identifier" which leads to a dedicated SIDF. This is advantageous if the MNO and MVNO have the same routing information (MCC+MNC) and the MNO needs to redirect to the MVNO. In alternative embodiments, it is to be understood that the SIDF identity information (identifier) can be sent outside of the SUCI message format.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, functions that facilitate an explanation of illustrative embodiments are represented. Subsequent figures may depict some additional elements/functions.

Accordingly, as shown, communication system 100 comprises user equipment (UE) 102 that communicates via an air interface 103 with an access point (gNB) 104. The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a UICC and an ME. The UICC is the user-dependent part of the UE and contains at least one Universal Subscriber Identity Module (USIM) and appropriate application software. The USIM securely stores the IMSI number and its related key, which are used to identify and authenticate subscribers to access networks. The ME is the user-independent part of the UE and contains terminal equipment (TE) functions and various mobile termination (MT) functions.

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or femto cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function in the core network (CN) part of the communication system that manages, among other network operations, access and authentication operations with the UE (through the access point 104).

The AMF 106 in this illustrative embodiment is operatively coupled to home subscriber functions 108, i.e., one or more functions that are resident in the home network of the subscriber. As shown, some of these functions include the above-mentioned AUSF, SIDF, and UDM functions, as well as a Network Repository Function (NRF).

The access point 104 is also operatively coupled to a serving gateway function 110 (e.g., Session Management Function (SMF) in a 5G network), which is operatively coupled to a Packet Data Network (PDN) Gateway (PGW) 112. PGW 112 is operatively coupled to a Packet Data Network, e.g., Internet 114. Further typical operations and functions of such network elements are not described here since they are not the focus of the illustrative embodiments and may be found in appropriate 3GPP 5G documentation.

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single UE, gNB, AMF, SEAF, AUSF, SIDF, NRF, UDM, SMF and PGW elements are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of function sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
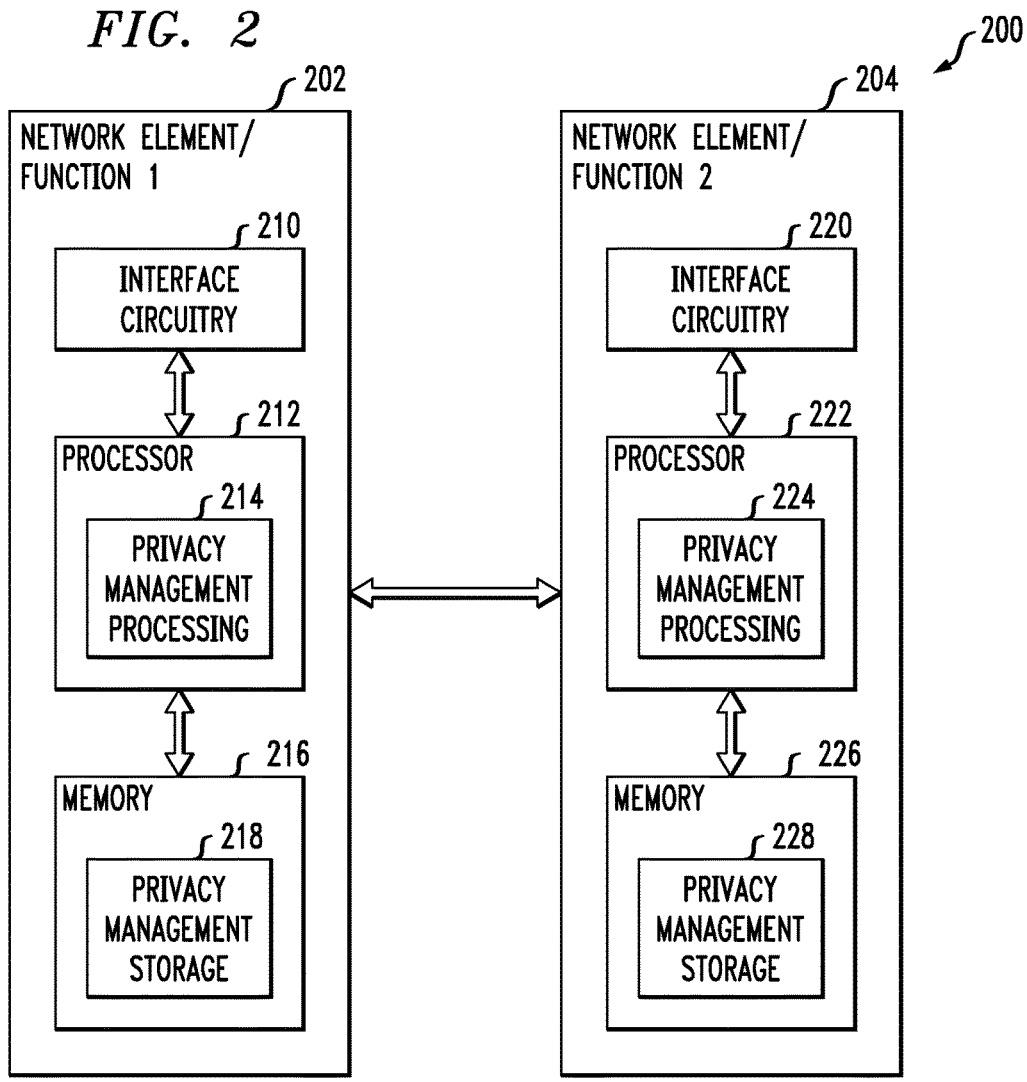
FIG. 2 is a block diagram of network elements/functions for providing subscriber privacy management in an illustrative embodiment.

FIG. 2 is a block diagram of network elements/functions for providing subscriber privacy management in an illustrative embodiment. System 200 is shown comprising a first network element/function 202 and a second network element/function 204. It is to be appreciated that the network elements/functions 202 and 204 represent any of the network elements/functions mentioned above, e.g., AMF, SEAF, AUSF, SIDF, NRF, UDM, that are configured to provide subscriber privacy management and other techniques described herein. For example, network element/function 202 may be an AUSF and network element/function 204 may be a UDM. Alternatively, network element/function 202 may be a UDM and network element/function 204 may be a SIDF.

The network element/function 202 comprises a processor 212 coupled to a memory 216 and interface circuitry 210. The processor 212 of the network element/function 202 includes a privacy management processing module 214 that may be implemented at least in part in the form of software executed by the processor. The processing module 214 performs privacy management described in conjunction with subsequent figures and otherwise herein. The memory 216 of the network element/function 202 includes a privacy management storage module 218 that stores data generated or otherwise used during privacy management operations.

The network element/function 204 comprises a processor 222 coupled to a memory 226 and interface circuitry 220. The processor 222 of the network element/function 204 includes a privacy management processing module 224 that may be implemented at least in part in the form of software executed by the processor 222. The processing module 224 performs privacy management described in conjunction with subsequent figures and otherwise herein. The memory 226 of the network element/function 204 includes a privacy management storage module 228 that stores data generated or otherwise used during privacy management operations.

The processors 212 and 222 of the respective network elements/functions 202 and 204 may comprise, for example, microprocessors, application-specific integrated circuits (ASICs), digital signal processors (DSPs) or other types of processing devices, as well as portions or combinations of such elements.

The memories 216 and 226 of the respective network elements/functions 202 and 204 may be used to store one or more software programs that are executed by the respective processors 212 and 222 to implement at least a portion of the functionality described herein. For example, subscriber privacy management operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 of the respective network elements/functions 202 and 204 illustratively comprise transceivers or other communication hardware or firmware that allows the associated system elements to communicate with one another in the manner described herein.

It is apparent from FIG. 2 that network element/function 202 is configured for communication with network element/function 204 and vice-versa via their respective interface circuitries 210 and 220. This communication involves network element/function 202 sending data to the network element/function 204, and the network element/function 204 sending data to the network element/function 202. However, in alternative embodiments, other network elements may be operatively coupled between the network elements/functions 202 and 204. The term "data" as used herein is intended to be construed broadly, so as to encompass any type of information that may be sent between network elements/functions (as well as between user equipment and a core network) including, but not limited to, identity data, key pairs, key indicators, privacy managing entity identifiers, authentication data, control data, audio, video, multimedia, etc.

It is to be appreciated that the particular arrangement of components shown in FIG. 2 is an example only, and numerous alternative configurations may be used in other embodiments. For example, any given network element/function can be configured to incorporate additional or alternative components and to support other communication protocols.

Other system elements such as UE 102 and gNB 104 may each also be configured to include components such as a processor, memory and network interface. These elements need not be implemented on separate stand-alone processing platforms, but could instead, for example, represent different functional portions of a single common processing platform.

Given the above-described illustrative 5G network configuration, in accordance with illustrative embodiments, after the AMF of the visiting network (VN) has identified the AUSF (108) of the home network (HN) of a given subscriber (UE) from the MCC+MNC of the SUCI, the AMF provides the SUCI to the AUSF. Note that, in accordance with illustrative embodiments, the SUCI in addition to the key identifier also includes the SIDF identifier. It is to be understood that when included in the SUCI message, the SIDF identifier is not concealed. As mentioned above, in alternative embodiments, the SDF identifier can be sent outside the SUCI format. For example, the SIDF identifier can be one information element when a request for AV for SUCI is sent.

In general, the AUSF can receive AV requests with the SUPI or SUCI, the latter in the initial registration, the former, if the UE was already authenticated and the AMF or other network element/function knows the SUPI. Thus, if the AUSF receives the SIDF identifier, it is also an indication that privacy is used (similar to a key identifier). Thus, the AUSF is configured to first request the UDM-offered SIDF service with the SUCI including the SIDF identifier. Then, after the AUSF gets back the SUPI, the AUSF can send a request for authentication data (Authentication Vectors or AVs) to the UDM (possibly after contacting the NRF for the correct UDM instance).

Alternatively, the AUSF can send the AV request with the SUCI and receives back the SUPI with the AVs. In this scenario, the UDM is handling the de-concealment via the SIDF internally and using the SUPI for directing the request to the correct UDM instance before responding to the AV request.

In either case, it is recommended that the SIDF in the UDM has a centrally-addressable identifier. In some embodiments, it is desirable to avoid having several instances for SIDF and doubling the private keys from a management perspective in case of updates. In fact, the address of SIDF may be mandated in some embodiments if privacy is switched on.

Further details regarding the performance of subscriber privacy management with the use of a privacy managing entity identifier will be discussed below with reference to FIGS. 3-5.

Figure 3:
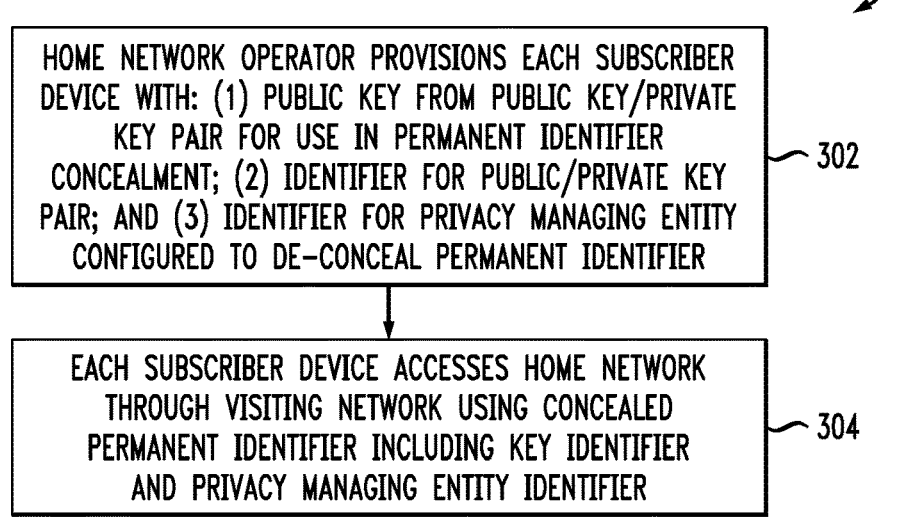
FIG. 3 is a flow diagram of a subscriber privacy management methodology in an illustrative embodiment.

FIG. 3 is a flow diagram of a subscriber privacy management methodology in an illustrative embodiment. More particularly, methodology 300 describes the initial provisioning stage whereby the subscriber devices (UEs) are provisioned with privacy data to allow them to access a communication system over an air interface without exposing their permanent identifiers. Provisioning of the privacy data to the UE can occur online (e.g., UE connected to the communication system), offline (e.g., UE not connected to the communication system), or some combination of both.

As shown, in step 302, the home network operator (MNO or some other provisioning entity) provisions each subscriber device (e.g., UE 102) with: (1) a public key from a public key/private key pair for use in permanent identifier concealment; (2) an identifier for the public/private key pair; and (3) an identifier for a privacy managing entity (e.g., SIDF) configured to de-conceal the subscriber's permanent identifier (e.g., SUPI).

Then, in step 304, each subscriber device (e.g., UE 102) accesses the home network (e.g., home subscriber functions 108) through a visiting network (e.g., mobility management functions 106) using a concealed permanent identifier (e.g., SUCI) including the key identifier and the privacy managing entity identifier (e.g., SIDF identifier).

Figure 4:
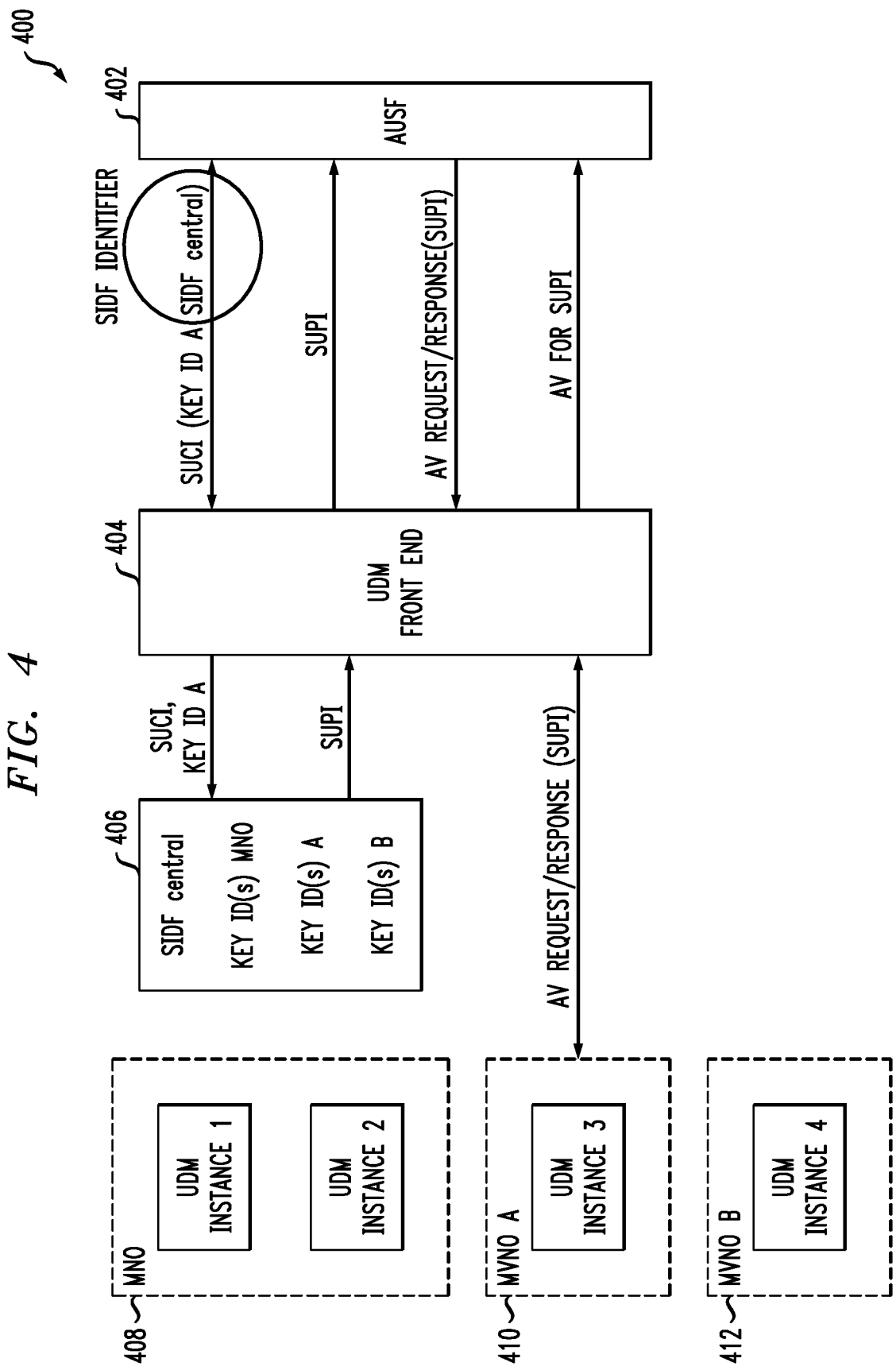
FIG. 4 is a block diagram of at least part of a communication system implementing subscriber privacy management in an illustrative embodiment.

FIG. 4 is a block diagram of at least part of a communication system implementing subscriber privacy management in an illustrative embodiment. More particularly, FIG. 4 illustrates a scenario 400 whereby subscriber authentication data is requested following the de-concealing step. It is assumed that the UE (102) sends SUCI (MNC+MCC+encrypted(MSIN)+key identifier+SIDF identifier) to AMF (106) of the visiting network. It is to be understood that parameters can be sent in any order and can be directly related to SUCI as shown above or these parameters could be separate information elements in the request to AUSF/UDM, whereby the request could be a de-concealment request or AV request. It is also assumed that the AMF in the visiting network selects the appropriate AUSF in the home network based on MNC+MCC. It is assumed that AUSF 402 in FIG. 4 is the selected AUSF.

AUSF 402 checks if a SUPI or a SUCI is received. If SUCI, then AUSF 402 forwards the SUCI to UDM (front end) 404, which maintains a mapping of SIDF identifier to SIDF address.

The UDM 404 selects and calls the central SIDF 406 based on the SIDF identifier. SIDF 406 uses the correct private key related to the received key identifier to de-conceal the SUCI. That is, based on the key identifier received, SIDF is able to identify the cryptographic key pair from which the subject UE used the corresponding public key to encrypt its SUPI.

SIDF 406 provides the SUPI back to the AUSF 402 via UDM 404.

AUSF 402 may request NRF (not expressly shown but part of the home subscriber functions 108 as mentioned above) for the correct UDM instance based on the SUPI. As shown in FIG. 4, there can be multiple UDM instances associated with the MNO 408, as well as separate UDM instances for multiple MNVOs 410 and 412.

AUSF 402 then requests authentication data (i.e., AVs) from the appropriate UDM instance (in this example, the UDM instance associated with MVNO 410) with the SUPI.

FIG. 5 is a block diagram of at least part of a communication system implementing subscriber privacy management in another illustrative embodiment. More particularly, FIG. 5 illustrates a scenario 500 whereby subscriber authentication data is requested concurrent with the privacy managing entity selecting step. It is assumed that the UE (102) sends SUCI (MNC+MCC+encrypted(MSIN)+key identifier+SIDF identifier) to AMF (106) of the visiting network. It is also assumed that the AMF in the visiting network selects the appropriate AUSF in the home network based on MNC+MCC. It is assumed that AUSF 502 in FIG. 5 is the selected AUSF.

AUSF 502 checks if a SUPI or a SUCI is received. If SUCI, then AUSF 502 forwards the SUCI as well as a request for authentication data (i.e., AVs) to UDM (front end) 504, which maintains a mapping of SIDF identifier to SIDF address.

The UDM 504 selects and calls the correct SIDF among multiple SIDFs 505, 506 and 507, based on the SIDF identifier. In this example, the selected SIDF is SIDF 506 which corresponds to MVNO 510. As shown in FIG. 5, there can be multiple UDM instances associated with the MNO 508, as well as separate UDM instances for multiple MNVOs 510 and 512.

SIDF 506 uses the correct private key related to the received key identifier to de-conceal the SUCI. That is, based on the key identifier received, SIDF 506 is able to identify the cryptographic key pair from which the subject UE used the corresponding public key to encrypt its SUPI.

SIDF 506 requests the authentication data (e.g., AVs) from the UDM instance associated with MVNO 510.

SIDF 506 then sends the AVs back to the AUSF 502 via UDM 504.

Accordingly, by adding the privacy managing entity (e.g., SIDF) identifier to the SUCI, in accordance with illustrative embodiments, all different configuration scenarios can be addressed, e.g., MNO with one central SIDF (FIG. 4), and MNO with a different SIDF for one or several UDM instances (FIG. 5).

In particular, in the MVNO use case, the MNO may contract out parts of its subscriber database, i.e., one UDM instance. Then, the MVNO may have its own SIDF or it may also use the SIDF from the MNO, but with a different key identifier. But the MNO at the same time may want to have for its other UDM instances just one SIDF identifier. Each of these scenarios are available according to illustrative embodiments.

In yet another illustrative embodiment, the key identifier alone could be sufficient to serve as the identifier for the central SIDF, if it is mandatory that if a privacy indicator is set, then the AUSF or the UDM always contacts the SIDF first.

It is to be appreciated that the naming of identifiers mentioned herein, e.g., IMSI, SUPI, SUCI, etc., are for illustrative purposes only. That is, an identifier for a UE may have different names or acronyms in different protocols and standards for different communication network technologies. As such, none of the specific names or acronyms given to these identifiers herein are intended to limit embodiments in any manner.

As indicated previously, the embodiments are not limited to the 5G context and the disclosed techniques can be adapted in a straightforward manner to a wide variety of other communication system contexts including, but not limited to, other 3GPP systems and non-3GPP systems which employ identity (e.g., IMSI or equivalent) in the identity request process.

The processor, memory, controller and other components of a user equipment or base station element of a communication system as disclosed herein may include well-known circuitry suitably modified to implement at least a portion of the identity request functionality described above.

As mentioned above, embodiments may be implemented in the form of articles of manufacture each comprising one or more software programs that are executed by processing circuitry of user equipment, base stations or other elements of a communication system. Conventional aspects of such circuitry are well known to those skilled in the art and therefore will not be described in detail herein. Also, embodiments may be implemented in one or more ASICS, FPGAs or other types of integrated circuit devices, in any combination. Such integrated circuit devices, as well as portions or combinations thereof, are examples of "circuitry" as that term is used herein. A wide variety of other arrangements of hardware and associated software or firmware may be used in implementing the illustrative embodiments.

It should therefore again be emphasized that the various embodiments described herein are presented by way of illustrative example only, and should not be construed as limiting the scope of the claims. For example, alternative embodiments can utilize different communication system configurations, user equipment configurations, base station configurations, key pair provisioning and usage processes, messaging protocols and message formats than those described above in the context of the illustrative embodiments. These and numerous other alternative embodiments within the scope of the appended claims will be readily apparent to those skilled in the art.

What is claimed is:

1. A method comprising:
   in a home network of a communication system, wherein one or more cryptographic key pairs are provisioned for utilization by one or more of a plurality of subscribers of the home network to conceal subscriber identifiers provided to one or more access points in the communication system;
   receiving, at one of the one or more access points from user equipment, a request for authentication data for one of the plurality of subscribers, the request for authentication data comprising a concealed subscriber identifier and a privacy managing entity identifier, the privacy managing entity identifier identifying one of one or more privacy managing entities in the home network of the communication system configured to de-conceal the concealed subscriber identifier;
   utilizing said one of the one or more privacy managing entities in the home network of the communication system identified by the privacy managing entity identifier in the request for authentication data to de-conceal the concealed subscriber identifier; and
   obtaining, from one of a plurality of different instances of a user data repository, the authentication data for said one of the plurality of subscribers utilizing the de-concealed subscriber identifier, each of the plurality of different instances of the user data repository maintaining authentication data for a different subset of the plurality of subscribers of the home network;
   wherein said one of the one or more privacy managing entities in the home network of the communication system comprises one of:
      a central privacy managing entity in the home network that manages de-concealment of concealed subscriber identifiers for a mobile network operator in the home network and one or more mobile virtual network operators in the home network;
      a first dedicated privacy managing entity associated with the mobile network operator in the home network; and
      a second dedicated privacy managing entity associated with one of the one or more mobile virtual network operators in the home network.

2. The method of claim 1, further comprising selecting said one of the one or more privacy managing entities in the communication system based at least in part on the privacy managing entity identifier received in the request for authentication data.

3. The method of claim 2, further comprising de-concealing the concealed subscriber identifier at the selected privacy managing entity.

4. The method of claim 3, further comprising requesting subscriber authentication data concurrent with the privacy managing entity selecting step.

5. The method of claim 4, wherein an authentication and security function of the communication system requests de-concealment of the concealed subscriber identifier concurrent with requesting authentication data for said one of the plurality of subscribers.

6. The method of claim 3, further comprising requesting subscriber authentication data following the de-concealing step.

7. The method of claim 6, wherein an authentication and security function of the communication system requests de-concealment of a given subscriber identifier and, in response to receiving the de-concealed subscriber identifier, requests authentication data for said one of the plurality of subscribers.

8. The method of claim 1, wherein at least one of the one or more privacy managing entities is implemented in the communication system as a subscription identifier de-concealing function.

9. The method of claim 1, wherein the home network comprises multiple user data management instances.

10. The method of claim 9, wherein the multiple user data management instances comprise one or more user data management instances associated with the one or more virtual network operators.

11. The method of claim 9, wherein the central privacy managing entity is used for the multiple user data management instances.

12. The method of claim 9, wherein multiple dedicated privacy managing entities are used for the multiple user data management instances.

13. An article of manufacture comprising a non-transitory computer-readable storage medium having embodied therein executable program code that when executed by a processor causes the processor to perform the steps of claim 1.

14. An apparatus comprising:
in a home network of a communication system, wherein one or more cryptographic key pairs are provisioned for utilization by one or more of a plurality of subscribers of the home network to conceal subscriber identifiers provided to one or more access points in the communication system;
at least one processor;
at least one memory including computer program code;
the at least one memory and the computer program code being configured to, with the at least one processor, cause the apparatus at least to:
receive, at one of the one or more access points from user equipment, a request for authentication data for one of the plurality of subscribers, the request for authentication data comprising a concealed subscriber identifier and a privacy managing entity identifier, the privacy managing entity identifier identifying one of one or more privacy managing entities in the home network of the communication system configured to de-conceal the concealed subscriber identifier;
utilize said one of the one or more privacy managing entities in the home network of the communication system identified by the privacy managing entity identifier in the request for authentication data to de-conceal the concealed subscriber identifier; and
obtain, from one of a plurality of different instances of a user data repository, the authentication data for said one of the plurality of subscribers utilizing the de-concealed subscriber identifier, each of the plurality of different instances of the user data repository maintaining authentication data for a different subset of the plurality of subscribers of the home network;
wherein said one of the one or more privacy managing entities in the home network of the communication system comprises one of:
a central privacy managing entity in the home network that manages de-concealment of concealed subscriber identifiers for a mobile network operator in the home network and one or more mobile virtual network operators in the home network;
a first dedicated privacy managing entity associated with the mobile network operator in the home network; and
a second dedicated privacy managing entity associated with one of the one or more mobile virtual network operators in the home network.

15. A method comprising:
in user equipment, storing: (i) one or more public keys associated with one or more cryptographic key pairs, the one or more cryptographic key pairs being provisioned by a home network of a communication system for use by the user equipment to conceal a subscriber identifier to be provided to one or more access points in the communication system; and (ii) one or more privacy managing entity identifiers for utilization by the user equipment when providing a concealed subscriber identifier to the one or more access points in the communication system, wherein each of the one or more privacy managing entity identifiers identifies a privacy managing entity of one or more privacy managing entities in the home network of the communication system configured to de-conceal the concealed subscriber identifier;
concealing the subscriber identifier utilizing one of the one or more public keys;
sending, from the user equipment to one of the one or more access points, a request for authentication data for one of a plurality of subscribers of the home network, the request for authentication data comprising the concealed subscriber identifier and one of the one or more privacy managing entity identifiers associated with one of the one or more privacy managing entities in the home network of the communication system; and
receiving, at the user equipment from said one of the one or more access points, the authentication data for said one of the plurality of subscribers, the authentication data being obtained from one of a plurality of different instances of a user data repository in the home network, each of the plurality of different instances of the user data repository maintaining authentication data for a different subset of the plurality of subscribers of the home network;
wherein said one of the one or more privacy managing entities in the home network of the communication system comprises one of:
a central privacy managing entity in the home network that manages de-concealment of concealed subscriber identifiers for a mobile network operator in the home network and one or more mobile virtual network operators in the home network;
a first dedicated privacy managing entity associated with the mobile network operator in the home network; and
a second dedicated privacy managing entity associated with one of the one or more mobile virtual network operators in the home network.

16. The method of claim 15, wherein the user equipment stores a key identifier that identifies one of the one or more cryptographic key pairs used by the user equipment to conceal the subscriber identifier.

17. The method of claim 16, further comprising sending the key identifier to said one of the one or more access points in the communication system.

18. The method of claim 17, wherein the concealed subscriber identifier, the key identifier, and the privacy managing entity identifier are sent in two or more separate messages to said one of the one or more access points.

19. An apparatus comprising a processor operatively coupled to a memory and configured to perform the steps of claim 15.

20. An article of manufacture comprising a non-transitory computer-readable storage medium having embodied therein executable program code that when executed by a processor causes the processor to perform the steps of claim 15.

* * * * *